United States Patent
Sato et al.

(10) Patent No.: US 10,255,887 B2
(45) Date of Patent: Apr. 9, 2019

(54) INTENSITY OF INTEREST EVALUATION DEVICE, METHOD, AND COMPUTER-READABLE RECORDING MEDIUM

(71) Applicant: FUJITSU LIMITED, Kawasaki-shi, Kanagawa (JP)

(72) Inventors: Teruyuki Sato, Tama (JP); Koichiro Niinuma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/663,897

(22) Filed: Jul. 31, 2017

(65) Prior Publication Data

US 2018/0061373 A1    Mar. 1, 2018

(30) Foreign Application Priority Data

Aug. 31, 2016 (JP) .................. 2016-170188

(51) Int. Cl.
   *G09G 5/34* (2006.01)
   *G06Q 30/02* (2012.01)
   *H04W 88/02* (2009.01)

(52) U.S. Cl.
   CPC .......... *G09G 5/34* (2013.01); *G06Q 30/0267* (2013.01); *G09G 2320/0261* (2013.01); *G09G 2354/00* (2013.01); *H04W 88/02* (2013.01)

(58) Field of Classification Search
   None
   See application file for complete search history.

(56) References Cited

U.S. PATENT DOCUMENTS

| 8,938,488 B1* | 1/2015 | Sayed ................. H04L 9/0872 709/201 |
| 9,258,606 B1* | 2/2016 | Collins ............ H04N 21/44218 |
| 2002/0038342 A1 | 3/2002 | Ito |
| 2011/0045803 A1* | 2/2011 | Kim .................. H04M 1/72519 455/412.2 |
| 2012/0158520 A1* | 6/2012 | Momeyer .......... G06Q 30/0273 705/14.69 |
| 2013/0179441 A1* | 7/2013 | Kuusik ................ H04L 67/306 707/732 |
| 2013/0311411 A1* | 11/2013 | Senanayake ............ G06F 3/013 706/13 |
| 2014/0100997 A1* | 4/2014 | Mayerle ............. G06Q 30/0643 705/27.2 |
| 2017/0223300 A1* | 8/2017 | Jang ....................... H04N 19/44 |

FOREIGN PATENT DOCUMENTS

JP    2002-108918    4/2002

* cited by examiner

*Primary Examiner* — Zhengxi Liu
(74) *Attorney, Agent, or Firm* — Fujitsu Patent Center

(57) ABSTRACT

A computer-readable recording medium storing an intensity of interest evaluation program that causes a computer to execute a procedure is provided. The procedure includes: using a movement amount detection sensor installed to an information processing terminal to detect a value of a movement amount of an information processing terminal in a period in which content is being displayed on the information processing terminal; and evaluating a intensity of interest toward the content based on a length of a first period within the period in which the detected value of the movement amount of the information processing terminal is a predetermined value or less.

20 Claims, 12 Drawing Sheets

FIG.8
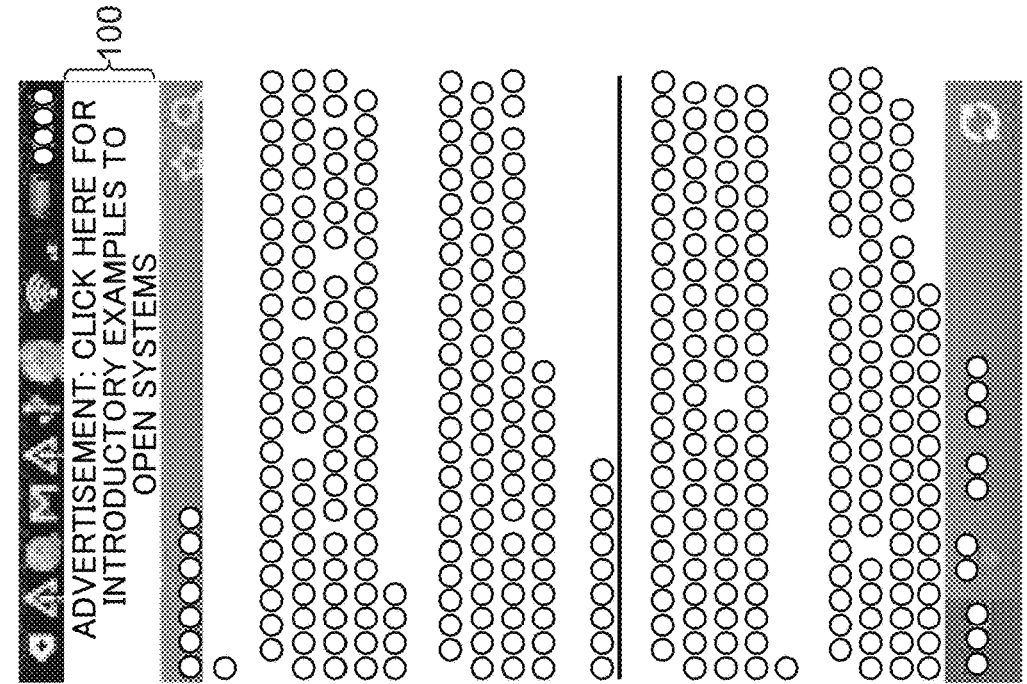
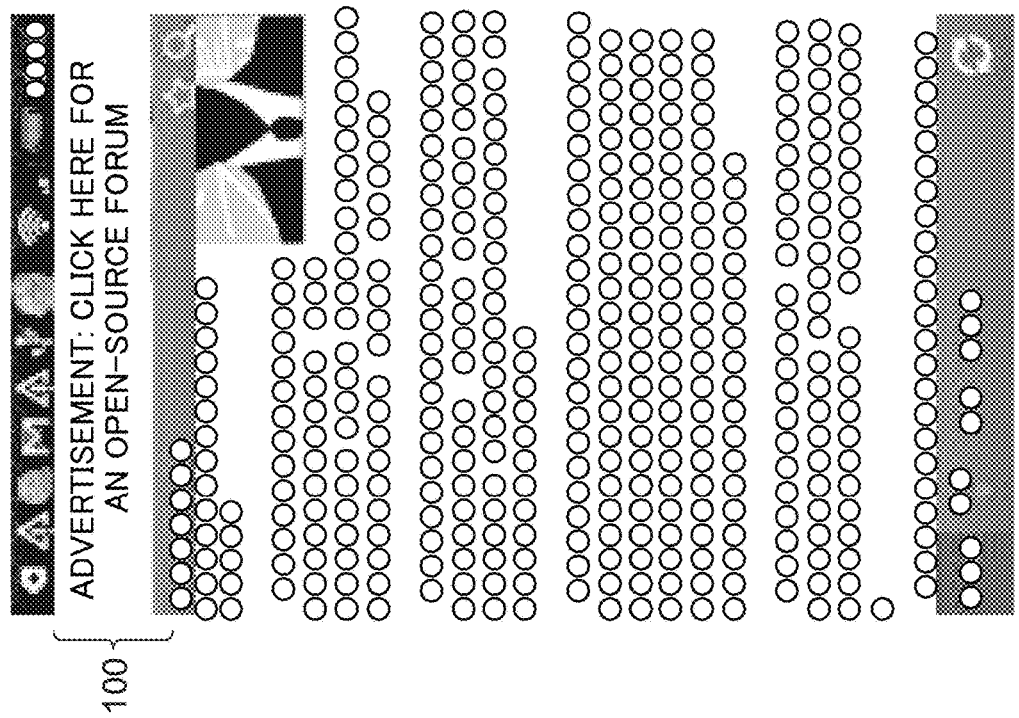

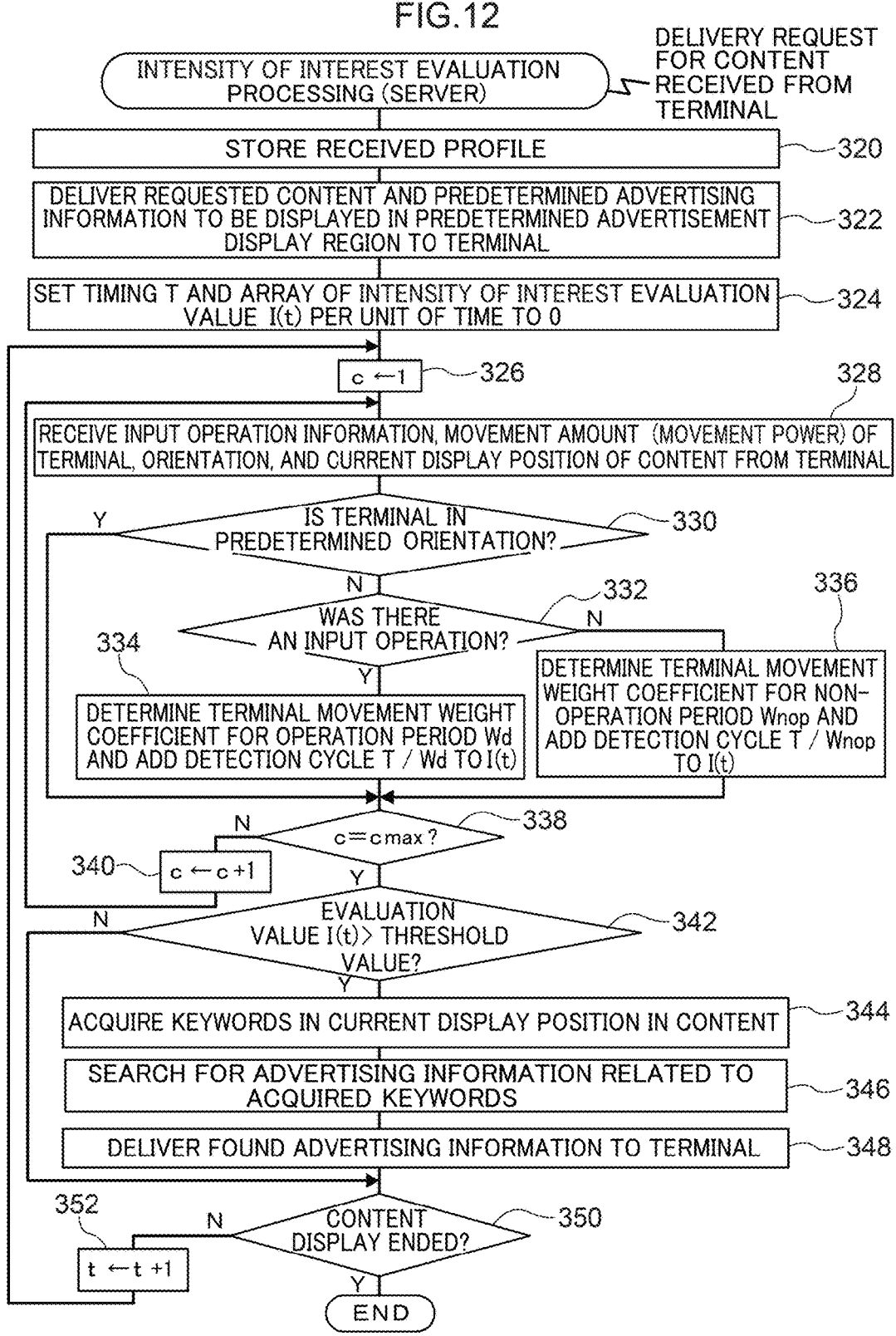

INTENSITY OF INTEREST EVALUATION DEVICE, METHOD, AND COMPUTER-READABLE RECORDING MEDIUM

CROSS-REFERENCE TO RELATED APPLICATION

This application is based upon and claims the benefit of priority of the prior Japanese Patent Application No. 2016-170188, filed on Aug. 31, 2016, the entire content of which is incorporated herein by reference.

FIELD

Technology disclosed herein relates to a intensity of interest evaluation device, a intensity of interest evaluation method, and a computer-readable recording medium.

BACKGROUND

A technology described by Japanese Patent Application Laid-Open (JP-A) No. 2002-108918 has been proposed as technology that detects user activity from a portable information terminal to which various content is provided through a wireless communication line, and that learns user preferences based on a history of user activity. The first technology detects user activity based on information obtained from the portable information terminal carried by the user, and acquires detected data including the following information: a user ID, an activity name, a related content ID, a timing, and a position. Then, the first technology generates preference analysis data by analyzing user preferences based on the acquired detected data, and updates a user preference information database.

Related Patent Documents

Japanese Laid-Open Patent Publication No. 2002-108918

When the user is viewing given content, the first technology determines that the user has expressed interest in the viewed content based on user activity, namely, the viewing of the content, and based on the time spent viewing the content.

SUMMARY

In one exemplary embodiment, a value of a movement amount of an information processing terminal is detected using a movement amount detection sensor installed to the information processing terminal in a period in which content is being displayed on the information processing terminal. An intensity of interest toward the content is then evaluated based on a length of a first period within the period in which the detected value of the movement amount of the information processing terminal is a predetermined value or less.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an illustrative diagram of an example of displaying content and an advertisement before and after determining the "intensity of interest peak".

FIG. 12 is a flowchart illustrating an example of intensity of interest evaluation processing.

DESCRIPTION OF EMBODIMENTS

An exemplary embodiment of technology disclosed herein is described in detail below, with reference to the drawings.

Outline

A situation is considered in which the user holds an information processing terminal in their hand and views displayed content while performing appropriate input operations such as instructing the displayed content to scroll. The present applicants, inventors, etc. have found that in such situations, the movement of the information processing terminal is suppressed when viewing portions of the displayed content in which the user has a high intensity of interest since the user concentrates on viewing the content more than when viewing portions in which the user has a low intensity of interest. Further, it has been confirmed that the suppression of movement of the information processing terminal when viewing portions of the content in which the user has a high intensity of interest is a phenomenon common to operation periods in which the user is performing input operations and non-operation periods in which the user is not performing input operations.

Based on the above, in the present exemplary embodiment, an intensity of interest evaluation value I(t) of the user for units of time (for example, 1 sec) toward the content is quantified based on Equation (1) below.

$$I(t) = \Sigma \text{ operation time/terminal movement weight coefficient for operation period } W_d - \Sigma \text{ non-operation time/terminal movement weight coefficient for non-operation period } W_{nop} \quad (1)$$

In Equation (1), "operation time" is the time spent operating in the unit of time, and "non-operation time" is the time not spent operating in the unit of time. Further, "terminal movement weight coefficient for operation period $W_d$" is found from a movement amount (movement power) of the information processing terminal within the operation period in the unit of time, and a profile of a weight coefficient $W_d$ such as that illustrated in FIG. 4, for example. Further, "terminal movement weight coefficient for non-operation period $W_{nop}$" is found from a movement amount (movement power) of the information processing terminal within a non-operation period in the unit of time, and a profile of a weight coefficient $W_{nop}$ like that illustrated in FIG. 4, for example.

Figure 4:
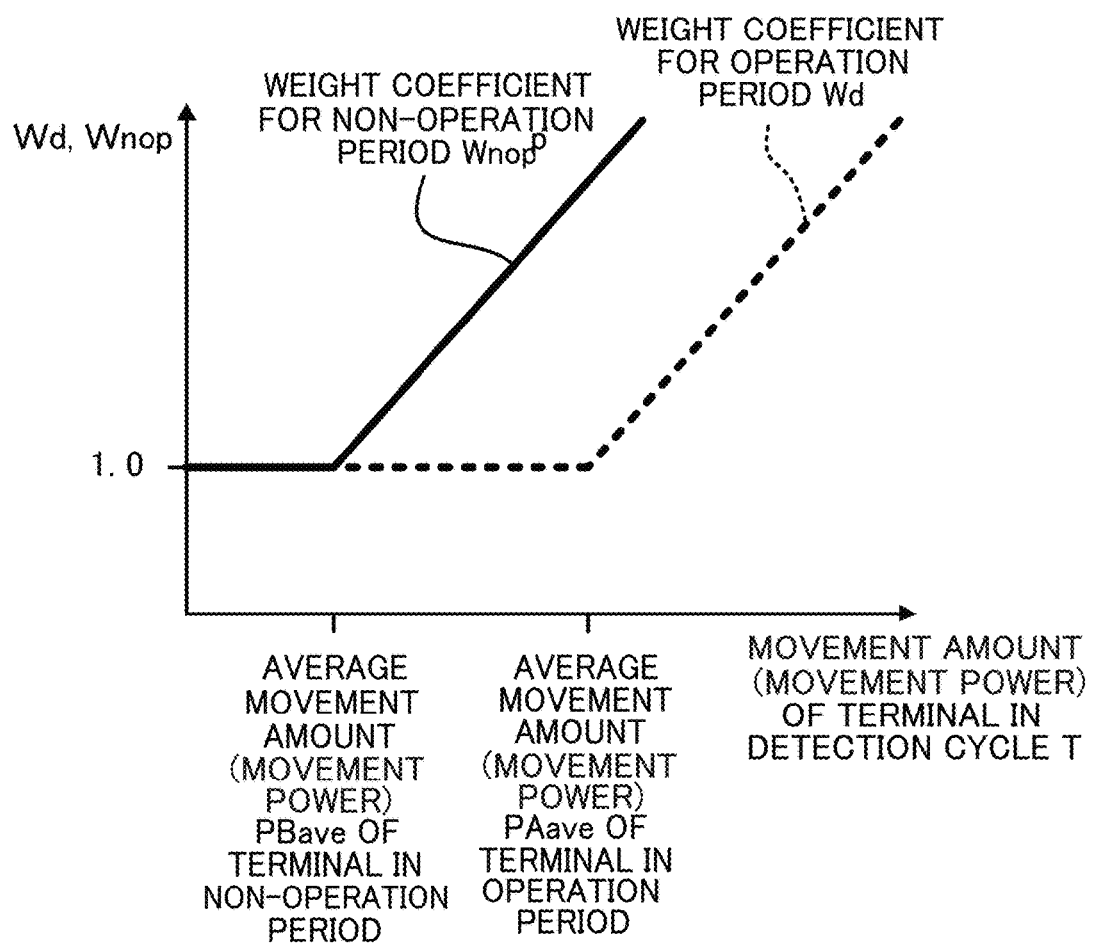
FIG. 4 is a line graph illustrating respective examples of a profile of a weight coefficient for an operation period $W_d$ and a profile of a weight coefficient for a non-operation period $W_{nop}$.

According to Equation (1) above and the profile of the weight coefficient $W_d$ illustrated in FIG. 4, when the movement amount (movement power) of the information processing terminal within the operation period is a predetermined value $PA_{ave}$ or less, the operation time is added to the intensity of interest evaluation value I(t) as-is, since the weight coefficient $W_d$ is 1.0. Accordingly, when the movement amount (movement power) of the information processing terminal is small within the operation period and the intensity of interest of the user toward the content is surmised to be high, the value of the intensity of interest evaluation value I(t) is high.

Further, when the movement amount (movement power) of the information processing terminal within the operation period exceeds the predetermined value $PA_{ave}$, the influence that operation time has on the intensity of interest evaluation value I(t) is lowered by increasing the value of the weight coefficient $W_d$ as the movement amount (movement power) increases. Accordingly, when the movement amount (movement power) of the information processing terminal within the operation period is large and the user is surmised to not be concentrating on viewing the content, the value of the intensity of interest evaluation value I(t) is lowered.

Further, according to Equation (1) above and the profile of the weight coefficient $W_{nop}$ illustrated in FIG. 4, when the movement amount (movement power) of the information processing terminal within the non-operation period is a predetermined value $PB_{ave}$ or less, the weight coefficient $W_{nop}$ is set to 1.0 such that the non-operation time is added to the intensity of interest evaluation value I(t) as-is. Accordingly, when the movement amount (movement power) of the information processing terminal within the non-operation period is small and the intensity of interest of the user toward the content is surmised to be high, the value of the intensity of interest evaluation value I(t) is high.

Further, when the movement amount (movement power) of the information processing terminal within the non-operation period exceeds the predetermined value $PB_{ave}$, the influence that the non-operation time has on the intensity of interest evaluation value I(t) is lowered by increasing the value of the weight coefficient $W_{nop}$ as the movement amount (movement power) increases. Accordingly, when the movement amount (movement power) of the information processing terminal within the non-operation period is large and the user is surmised not to be concentrating on viewing the content, the value of the intensity of interest evaluation value I(t) is lowered.

Accordingly, using Equation (1) above and the profile of the weight coefficients $W_d$ and $W_{nop}$ illustrated in FIG. 4 enables the intensity of interest of the user viewing the content displayed on the information processing terminal to be evaluated quantitatively. Further, enabling evaluation of intensity of interest of the user for units of time also enables it to be determined whether the intensity of interest toward any item of information out of the plural items of the information is high in cases in which plural items of information are included in the content displayed on the information processing terminal.

First Exemplary Embodiment

Figure 1:
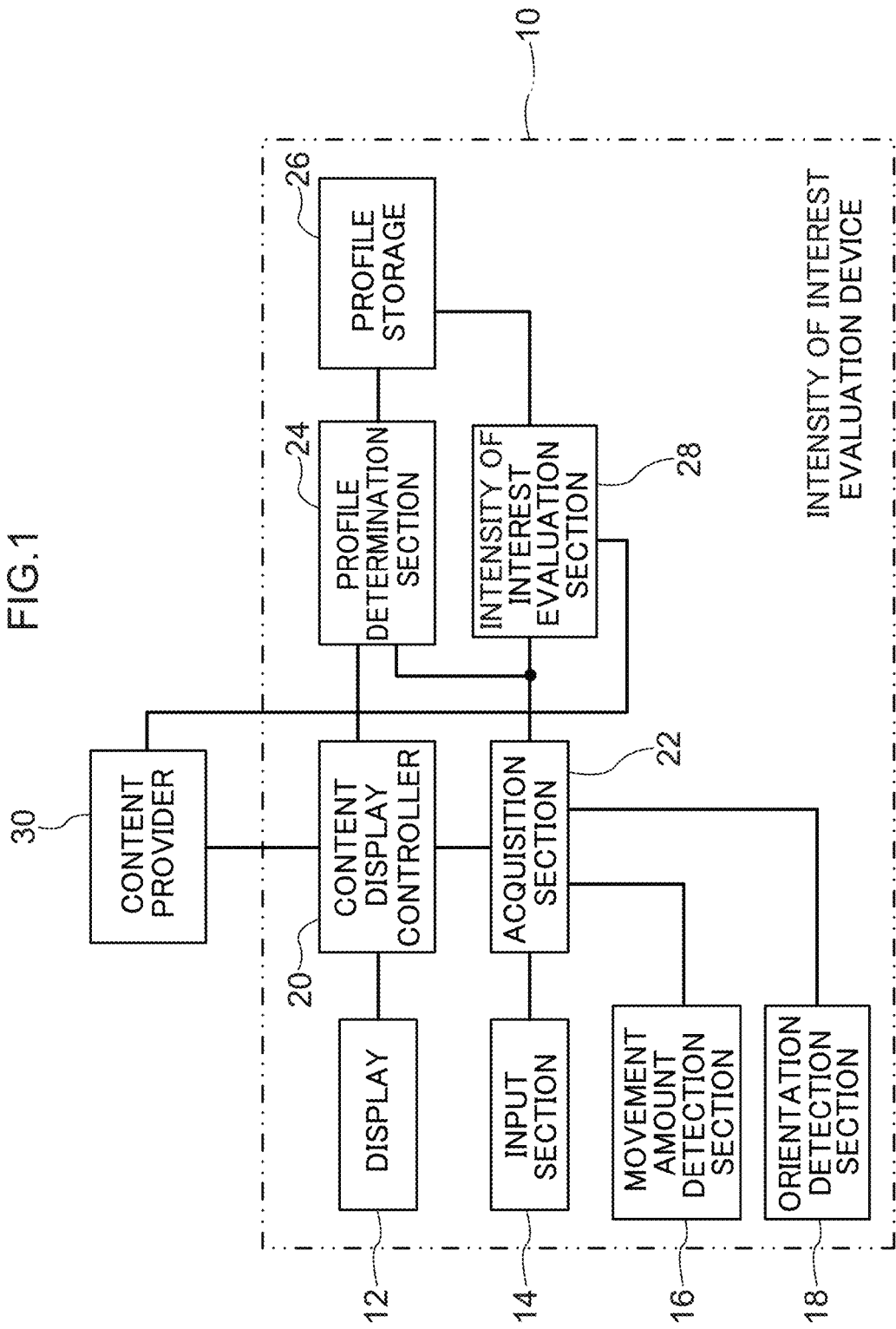
FIG. 1 is a functional block diagram of an intensity of interest evaluation device.

A intensity of interest evaluation device 10 illustrated in FIG. 1 includes a display 12, an input section 14, a movement amount detection section 16, an orientation detection section 18, a content display controller 20, an acquisition section 22, a profile determination section 24, a profile storage 26, and a intensity of interest evaluation section 28.

The display 12 is, for example, implemented by a liquid crystal display (LCD), an organic electroluminescence display (OELD), or the like. The display 12 is installed to an information processing terminal 36A (see FIG. 2), described later, and is connected to the content display controller 20. The content display controller 20 is connected to a content provider 30, and displays content provided from the content provider 30 on the display 12 so as to present the content to the user using the information processing terminal 36A. Note that it is sufficient that the content provided from the content provider 30 be displayable on the display 12. Typical examples of content include text such as documents. Content that includes graphics such as maps and content that includes video images may also be employed.

The input section 14 is installed to the information processing terminal 36A, is, for example, implemented by a touch panel superimposed on the display 12, and is connected to the acquisition section 22. The input section 14 outputs a time series of input operation information to the acquisition section 22. When input operations are not being performed by the user of the information processing terminal 36A, the input operation information is information indicating that input operations are not being performed. Further, when an input operation such as a tap, a flick, a swipe, or a pinch has been performed by a user, the information includes the timing of the input operation, the type of the input operation, and coordinates of a position of contact between the finger of the user and the input section 14 (the display surface of the display 12).

The acquisition section 22 is connected to the content display controller 20, and outputs input operation information acquired from the input section 14 to the content display controller 20. The content display controller 20 controls scrolling, enlarging/shrinking, and the like of content displayed on the display 12 based on the input operation information input from the acquisition section 22.

The movement amount detection section 16 is installed to the information processing terminal 36A and detects a movement amount of the information processing terminal 36A. In the present exemplary embodiment, a mode is described in which the movement amount detection section 16 is implemented by a triaxial angular velocity sensor 44, a triaxial accelerometer 46, and a triaxial terrestrial magnetism sensor 48 illustrated in FIG. 2. However, the movement amount detection section 16 may be implemented by one or more types of sensor out of the three types of sensor, 44, 46, and 48, above. The movement amount detection section 16 is connected to the acquisition section 22, and the acquisition section 22 acquires a movement amount of the information processing terminal 36A from the movement amount detection section 16 for each predetermined detection cycle T (for example, T=200 msec).

The orientation detection section 18 is installed to the information processing terminal 36A and detects the orientation of the information processing terminal 36A. In the present exemplary embodiment, a mode is described in which the orientation detection section 18 is implemented by the triaxial accelerometer 46 illustrated in FIG. 2; however, the sensor that implements the orientation detection section 18 may employ the triaxial magnetism sensor 48, or may be provided separately from the sensors that implement the movement amount detection section 16. The orientation detection section 18 is connected to the acquisition section 22, and the acquisition section 22 acquires the orientation of the information processing terminal 36A from the orientation detection section 18 at each predetermined detection cycle T (for example, T=200 msec).

The acquisition section 22 is connected to the profile determination section 24 and the intensity of interest evaluation section 28, and the profile determination section 24 is connected to the profile storage 26 and the content display controller 20. Further, the intensity of interest evaluation section 28 is connected to the profile storage 26 and the content provider 30. As described above, in the present exemplary embodiment, within the period in which the content is displayed on the display 12, periods in which the movement amount of the information processing terminal 36A is comparatively small are considered periods in which the user is concentrating on viewing the content, and the intensity of interest of the user toward the content is evaluated. However, the movement amount of the information processing terminal 36A when the user is concentrating on viewing the content is not limited to matching operation periods in which the user performed input operations and non-operation periods in which the user did not perform input operations. Further, there are also differences in the movement amount of the information processing terminal 36A between individuals when concentrating on viewing the content.

Therefore, the profile determination section 24 provides content for profile determination to the content display controller 20, and displays the content for profile determination on the display 12. The content for profile determination is preferably content that creates a need to perform input operations when the user is viewing and that enables evaluation of whether the user was concentrating on viewing the content. Examples thereof include content in which a quiz that can be easily answered by the user if the user is concentrating on viewing the content is given as text having a length that will cause the user to perform a scroll operation while viewing. In such cases, if the user answers correctly, it can be evaluated that the user is concentrating on viewing the content, and the profile can be determined as described below. The content for profile determination is an example predetermined content of technology disclosed herein.

Further, the profile determination section 24 calculates an average movement amount $PA_{ave}$ of the information processing terminal 36A in the operation period based on the input operation information and the movement amount of the information processing terminal 36A acquired by the acquisition section 22. Further, the profile determination section 24 calculates an average movement amount $PB_{ave}$ of the information processing terminal 36A during the non-operation period based on the input operation information and the movement amount of the information processing terminal 36A. The profile determination section 24 then determines the profile of the weight coefficient for operation period $W_d$ that changes the value of the weight coefficient for operation period $W_d$, with the average movement amount $PA_{ave}$ serving as a boundary. Further, the profile determination section 24 determines a profile of the weight coefficient for the non-operation period $W_{nop}$ that changes the value of the weight coefficient for the non-operation period $W_{nop}$, with the average movement amount $PB_{ave}$ serving as a boundary.

An example of the profile of the weight coefficient for the operation period $W_d$ and the profile of the weight coefficient for the non-operation period $W_{nop}$ is illustrated in FIG. 4. The profile of the weight coefficients weight coefficient for operation period $W_d$ and the profile of the weight coefficient for the non-operation period $W_{nop}$ determined by the profile determination section 24 are stored in the profile storage 26.

The intensity of interest evaluation section 28 evaluates the intensity of interest of the user toward the displayed content while the content subject to intensity of interest evaluation is displayed on the display 12. Evaluation of the intensity of interest by the intensity of interest evaluation section 28 is performed for each unit of time (for example, 1 sec) based on the input operation information, the movement amount of the information processing terminal 36A, and the orientation of the information processing terminal 36A, which are acquired by the acquisition section 22, and based on the profiles stored in the profile storage 26.

Note that in FIG. 1, the movement amount detection section 16 is an example of a movement amount detection sensor of the present disclosure, the acquisition section 22 is an example of an acquisition section of the present disclosure, the intensity of interest evaluation section 28 is an example of a intensity of interest evaluation section of the present disclosure, and the orientation detection section 18 is an example of an orientation detection sensor of the present disclosure. Further, the profile determination section 24 is an example of a determination section of the present disclosure.

Figure 2:
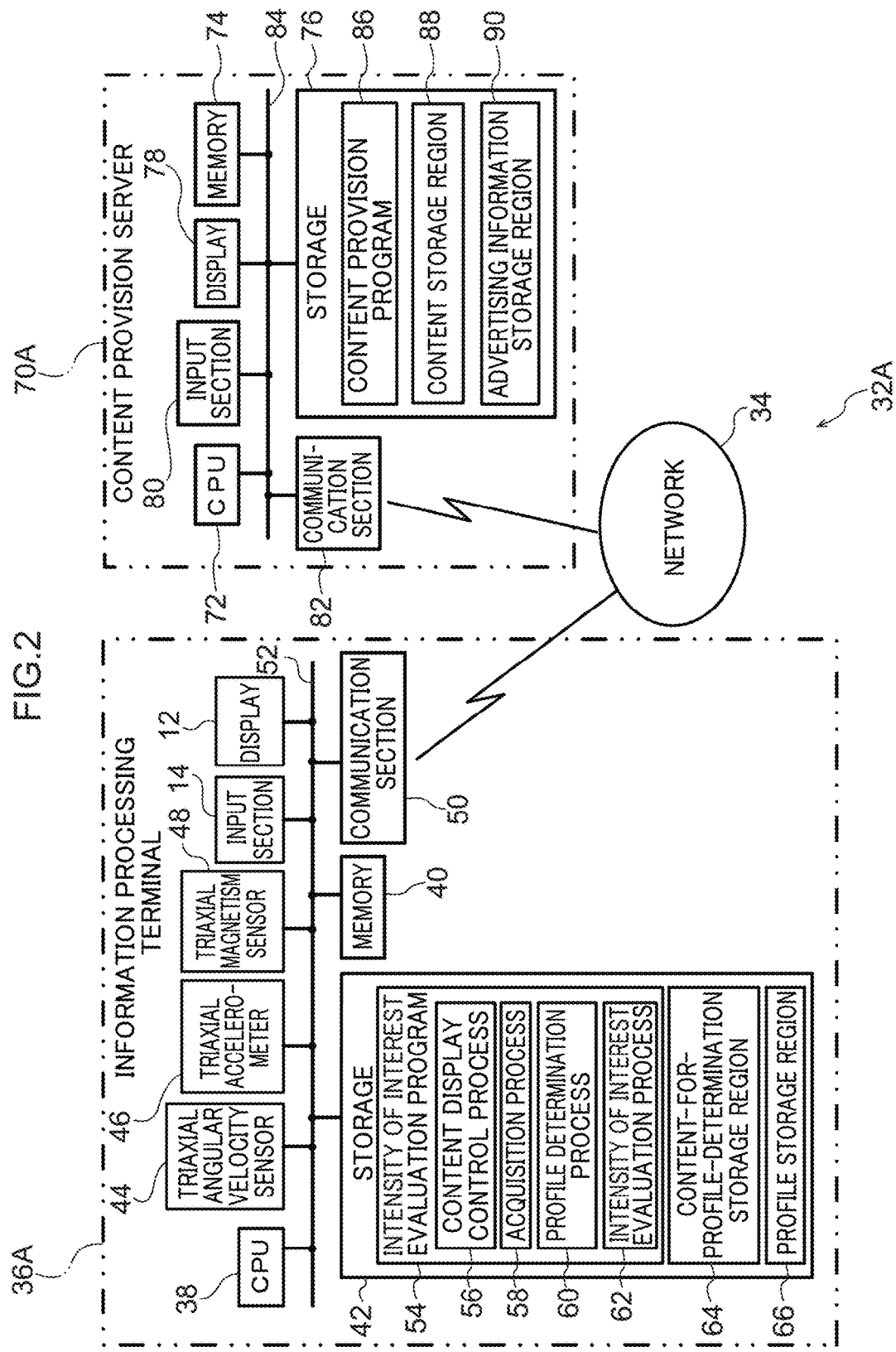
FIG. 2 is a schematic block diagram of an information processing terminal and a content providing server that function as an intensity of interest evaluation device according to the first exemplary embodiment.

An information processing system 32A illustrated in FIG. 2 includes the information processing terminal 36A and a content providing server 70A that are capable of communicating through a network 34. In the first exemplary embodiment, the intensity of interest evaluation device 10 is implemented by the information processing terminal 36A illustrated in FIG. 2. The information processing terminal 36A includes a CPU 38, memory 40, a storage 42, the display 12, the input section 14, the triaxial angular velocity sensor 44, the triaxial accelerometer 46, the triaxial magnetism sensor 48, and a communication section 50. The CPU 38, the memory 40, the storage 42, the display 12, the input section 14, the triaxial angular velocity sensor 44, the triaxial accelerometer 46, the triaxial magnetism sensor 48, and the communication section 50 are connected to one another by a bus 52.

The storage 42 is implemented by a hard disk drive (HDD), a solid state drive (SSD), flash memory, or the like. A intensity of interest evaluation program 54 that causes the information processing terminal 36A to function as the intensity of interest evaluation device 10 is stored in the storage 42. The CPU 38 reads the intensity of interest evaluation program 54 from the storage 42, expands the intensity of interest evaluation program 54 into the memory 40, and sequentially executes the processes included in the intensity of interest evaluation program 54. The intensity of interest evaluation program 54 includes a content display control process 56, an acquisition process 58, a profile determination process 60, and a intensity of interest evaluation process 62.

The CPU 38 operates as the content display controller 20 illustrated in FIG. 1 by executing the content display control process 56. The CPU 38 also operates as the acquisition section 22 illustrated in FIG. 1 by executing the acquisition process 58. The CPU 38 also operates as the profile determination section 24 illustrated in FIG. 1 by executing the profile determination process 60. The CPU 38 also operates as the intensity of interest evaluation section 28 illustrated in FIG. 1 by executing the intensity of interest evaluation process 62. Further, a content-for-profile-determination storage region 64 and a profile storage region 66 are provided in the storage 42. The content for profile determination is pre-stored in the content-for-profile-determination storage region 64, and the profile storage region 66 functions as the profile storage 26. The information processing terminal 36A accordingly executes the intensity of interest evaluation program 54 and functions as the intensity of interest evaluation device 10. Note that in the first exemplary embodiment, the intensity of interest evaluation program 54 is an example of a intensity of interest evaluation program according to the present disclosure.

Further, the content providing server 70A includes a CPU 72, memory 74, a storage 76, a display 78 such as a monitor, an input section 80 such as a mouse and keyboard, and a communication section 82. The CPU 72, the memory 74, the storage 76, the display 78, the input section 80, and the communication section 82 are connected to one another by a bus 84.

The storage 76 is implemented by a HDD, an SSD, flash memory, or the like. A content provision program 86 for causing the content providing server 70A to function as the content provider 30 is stored in the storage 76. Further, a content storage region 88 and an advertising information storage region 90 are provided in the storage 76. Content that can be provided to the intensity of interest evaluation device 10 is pre-stored in the content storage region 88, and advertising information provided to the intensity of interest evaluation device 10 when the content is provided to the intensity of interest evaluation device 10 is pre-stored in the advertising information storage region 90.

Figure 3:
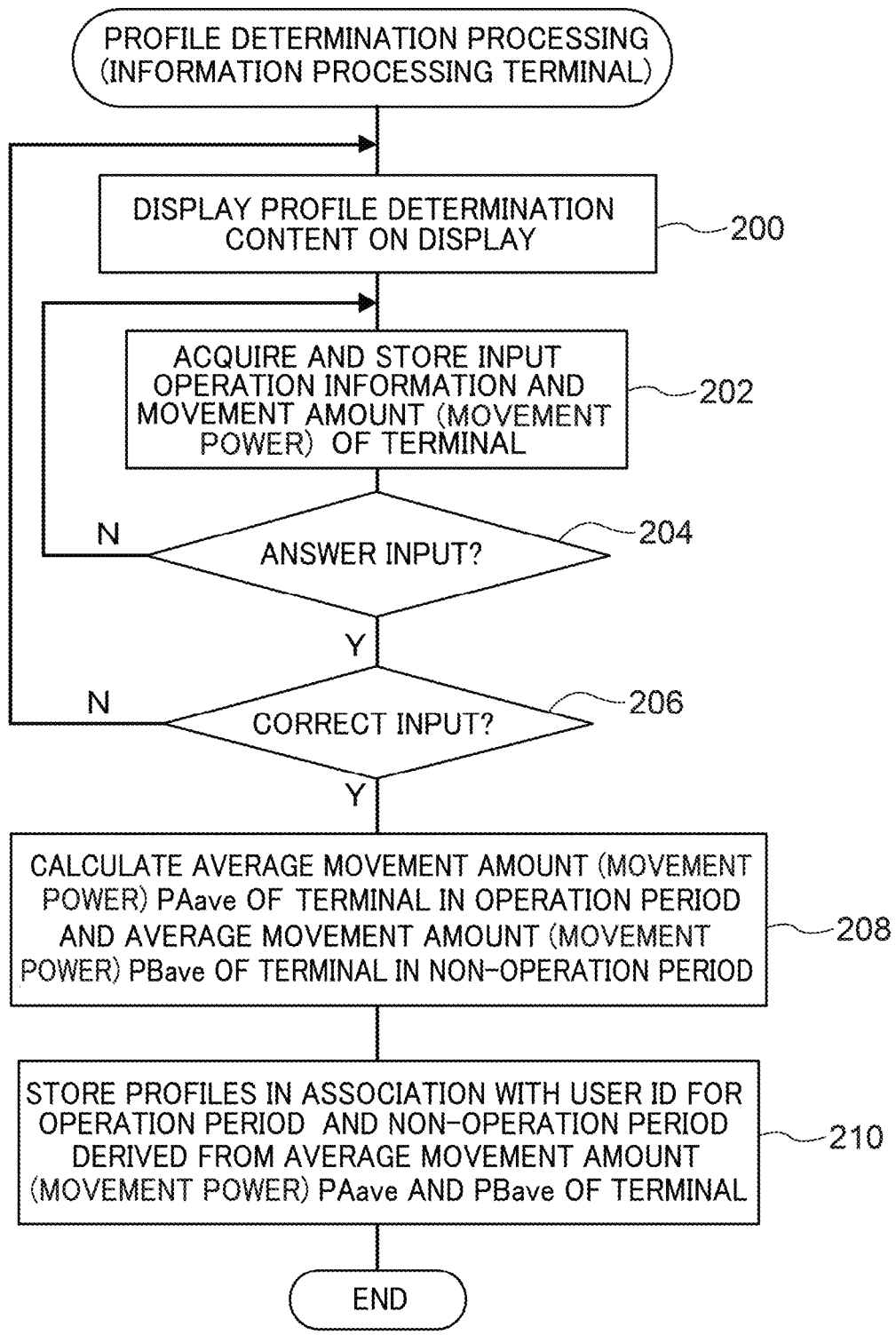
FIG. 3 is a flowchart illustrating an example of profile determination processing.

Next, profile determination processing performed by the profile determination section 24 is described as the operation of the first exemplary embodiment, with reference to FIG. 3 initially. It is sufficient to execute the profile determination processing at least once for each individual user. Thus, in a mode in which the information processing terminal 36A is employed by only a single user, the profile determination processing is, for example, executed at a timing such as when the information processing terminal 36A is initially connected to a power source.

Further, in a mode in which the information processing terminal 36A is used by plural users, configuration may be made such that, for example, each time a user logs in to the information processing terminal 36A, a corresponding profile stored in the profile storage 26 is checked for, and the profile determination processing is executed if no such profile is stored. Further, in a mode in which plural information processing terminals 36A are selectively employed by one user, one profile storage 26 may be provided, the profile storage 26 being accessible to each of the plural information processing terminals 36A included in an information processing system 32.

At step 200 of the profile determination processing, the profile determination section 24 reads the content for profile determination from the content-for-profile-determination storage region 64 of the storage 42 and provides the content for profile determination to the content display controller 20. The content display controller 20 then displays the content for profile determination provided from the profile determination section 24 on the display 12. Here, a mode is described in which the content for profile determination is content that presents a quiz that is easily answerable if the user is concentrating on viewing the content, and that is text having a length that causes the user to perform a scroll operation while viewing.

At step 202, the profile determination section 24 acquires, via the acquisition section 22, the input operation information output by the input section 14 and the movement amount of the terminal detected by the movement amount detection section 16, and stores the acquired information in the memory 40 or the like. At step 204, the profile determination section 24 determines whether or not an answer to the quiz presented by the content for profile determination has been input by the user. When the determination of step 204 is negative, processing returns to step 202, and steps 202 and 204 are repeated until the determination of step 204 is affirmative.

When the determination of step 204 is affirmative, processing transitions to step 206, and at step 206, the profile determination section 24 determines whether or not the answer input by the user matches the correct answer for the quiz given by the content for profile determination. The following is one example of a quiz that may be given by the content for profile determination: "There are a people on a bus. At bus stop 1, b people boarded the bus and c people alighted from the bus. At bus stop 2, d people boarded the bus and e people alighted from the bus. How many passengers are on the bus?"

In cases in which the determination of step 206 is negative, it can be determined that the user was not concentrating on viewing the content for profile determination. Thus, when the determination of step 206 is negative, processing returns to step 200, and the processing of step 200 onward is repeated. For example, if the quiz is related to the number of passengers on a bus as described in the example above, changing the values of parameters such as a, b, c, etc. enables quizzes with different correct answers to be given without changing the content for profile determination itself.

Further, when the answer that was input by the user matched the correct answer for the quiz given by the content for profile determination, it can be determined that the user was concentrating on viewing the content for profile determination. Thus, when affirmative determination was made at step 206, processing transitions to step 208, and in step 208 onward, the profiles of the weight coefficients are determined based on the information that was stored in the memory 40 or the like at step 202.

At step 208, based on the input operation information, the profile determination section 24 splits the period in which the user was viewing the content for profile determination into an operation period in which there was an input operation by the user, and a non-operation period in which there were no input operations by the user. Further, the profile determination section 24 calculates, at each timing of the detection cycle T slices, the movement amount of the information processing terminal 36A detected for each detection cycle T, namely, the respective detection values of the triaxial angular velocity, the triaxial acceleration, and the triaxial terrestrial magnetism, are squared and summed to calculate the movement amount (movement amount (movement power)) P at each timing. The profile determination section 24 then, calculates the average value of the movement amount P within the operation periods for each timing as the average movement amount $PA_{ave}$ of the terminal within the operation periods, and also calculates the average value of the movement amount P within the non-operation periods for each timing as the average movement amount $PB_{ave}$ of the terminal within the non-operation periods.

At step 210, the profile determination section 24 derives the profile for the operation period, which defines the relationship between the movement amount P of the terminal within the operation period and the terminal movement weight coefficient for the operation period $W_d$ based on the average movement amount $PA_{ave}$ of the terminal within the operation period calculated at step 208. As an example, as illustrated in FIG. 4, the profile for the operation period sets weight coefficient $W_d$ to 1 if the movement amount P of the terminal within the operation period is the average movement amount $PA_{ave}$ or less, or when the movement amount P exceeds the average movement amount $PA_{ave}$, sets the weight coefficient $W_d$ such that the weight coefficient $W_d$ increases as the movement amount P increases.

Further, the profile determination section 24 derives the profile for the non-operation period, which defines the relationship between the movement amount P of the terminal within the non-operation period and the terminal movement weight coefficient for the non-operation period $W_{nop}$ based on the average movement amount $PB_{ave}$ of the terminal within the non-operation period calculated at step 208. As illustrated in FIG. 4, the profile for the non-operation period sets the weight coefficient $W_{nop}$ to 1 if the movement amount P of the terminal within the non-operation period is the average movement amount $PB_{ave}$ or less, or when the movement amount P exceeds the average movement amount $PB_{ave}$, sets the weight coefficient $W_{nop}$ such that the weight coefficient $W_{nop}$ increases as the movement amount P increases.

The profile determination section 24 then stores the generated profile of the weight coefficient for the operation period $W_d$ and profile of the weight coefficient for the non-operation period $W_{nop}$ in the profile storage 26 in association with the user ID of the current user, and the profile determination processing ends.

Figure 5:
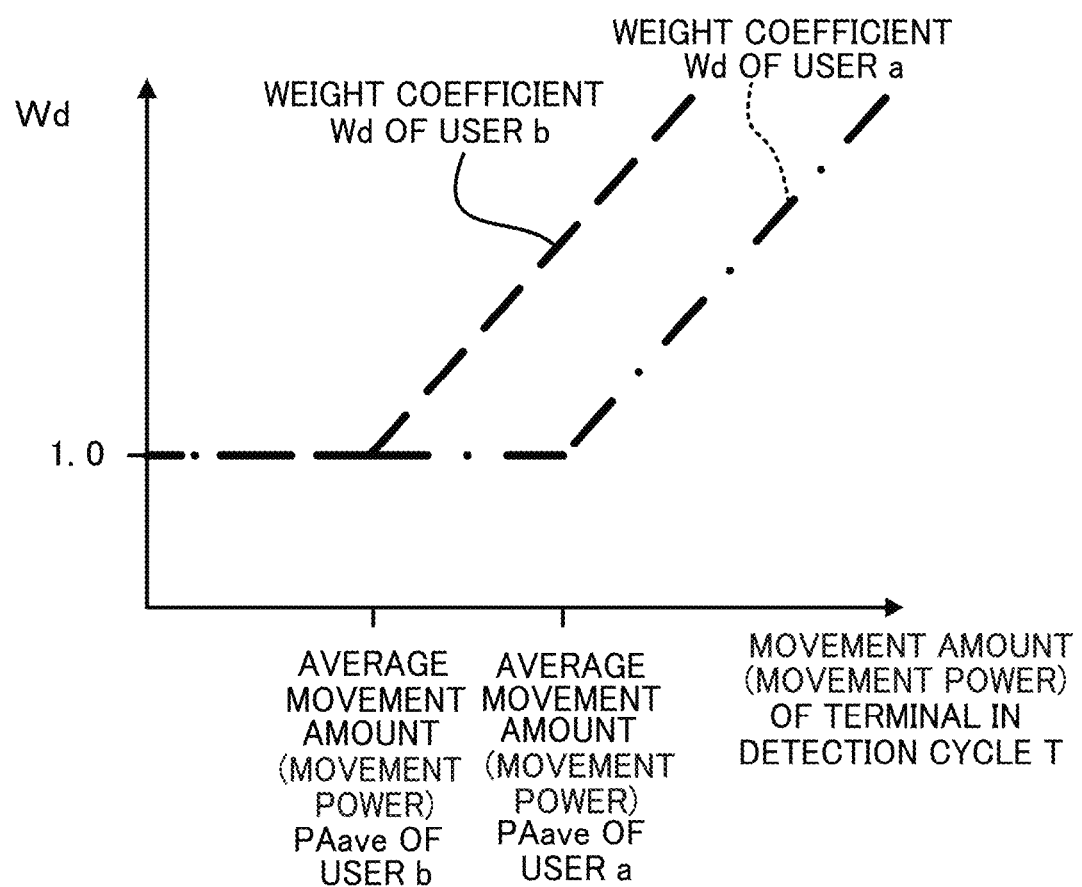
FIG. 5 is a line graph illustrating respective examples of a profile of a weight coefficient for an operation period $W_d$ for each user.

As described above, the profile determination processing is performed for each user. Accordingly, as illustrated as an example in FIG. 5, the profile of each individual user stored in the profile storage 26 reflects the characteristics of the individual user. As illustrated as an example in FIG. 5, there are differences in the average movement amount $PA_{ave}$ of the terminal within the operation period between user a and user b, and the profile of the weight coefficient for the operation period $W_d$ of the user a and the profile of the weight coefficient for the operation period $W_d$ of the user b are therefore also illustrated differing from each other. Note that although FIG. 5 only illustrates the profile of the weight coefficient for the operation period $W_d$, the profiles of the weight coefficient for the non-operation period $W_{nop}$ will also differ between user a and user b if the average movement amount $PB_{ave}$ of the terminal in the non-operation period differs between the user a and the user b.

Figure 6:
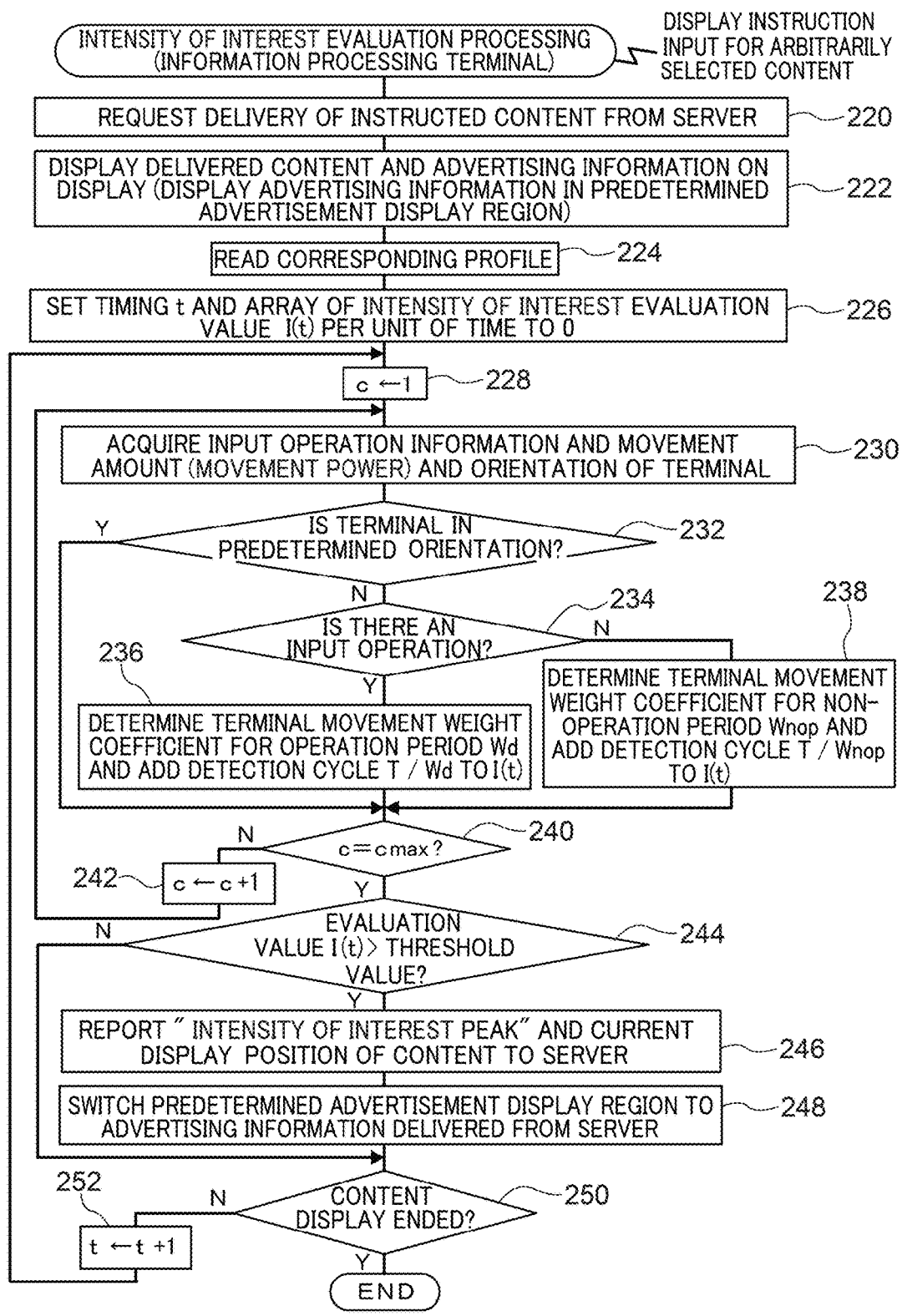
FIG. 6 is a flowchart illustrating an example of intensity of interest evaluation processing.

Next, with reference to FIG. 6, description follows regarding intensity of interest evaluation processing executed by the information processing terminal 36A when triggered by an instruction from the user to display arbitrarily selected content on the display 12. Content instructed to be displayed on the display 12 by the user is set as the intensity of interest evaluation target in the intensity of interest evaluation processing. At step 220 of the intensity of interest evaluation processing, the content display controller 20 makes a request to the content provider 30 (the content providing server 70A) for information to request the delivery of the content instructed to be displayed on the display 12 by the user.

Figure 7:
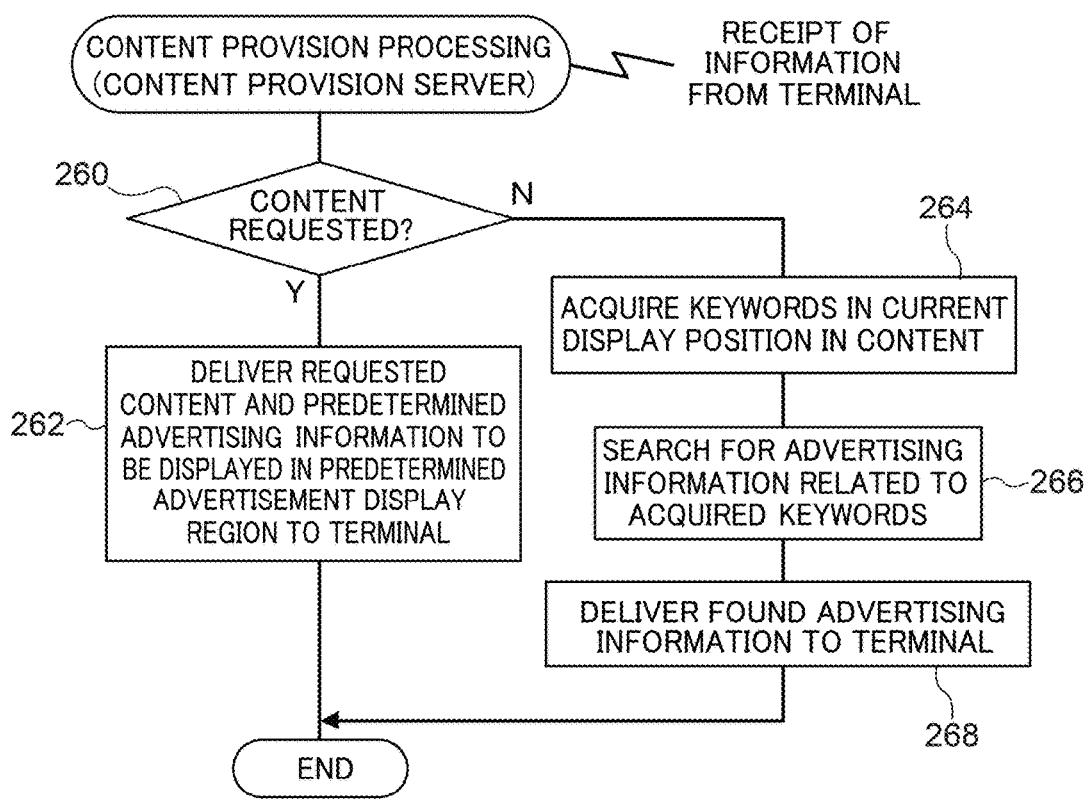
FIG. 7 is a flowchart illustrating an example of content provision processing.

The content providing server 70A executes the content provision processing illustrated in FIG. 7 when triggered by any information from the information processing terminal 36A being received. At step 260 of the content provision processing, the content provider 30 determines whether or not the information requesting delivery of the content is information received from the information processing terminal 36A. When affirmative determination has been made at step 260, processing transitions to step 262.

At step 262, the content provider 30 reads, from the content storage region 88, the information of the content that the information processing terminal 36A requested for delivery and also reads predetermined advertising information from the advertising information storage region 90. The content provider 30 then delivers (transmits) the content information and the predetermined advertising information to the information processing terminal 36A from which the delivery request originated, and the content provision processing ends.

When the information of content and the predetermined advertising information are delivered from the content providing server 70A, the information processing terminal 36A executing the intensity of interest evaluation processing (FIG. 6) performs the processing of step 222 of the intensity of interest evaluation processing. Namely, at step 222, the content display controller 20 causes display of an advertisement representing advertising information in a predetermined advertisement display region in the display screen of the display 12, and causes display of content representing content information in a remaining region of the display screen of the display 12. As an example, the left side of FIG. 8 illustrates a case in which an advertisement is displayed in an advertisement display region 100 at the upper side of the display screen of the display 12.

The user will usually be holding the information processing terminal 36A in their hand when content is displayed on the display 12 of the information processing terminal 36A, and the user will view the displayed content while performing appropriate input operations such as instructing the displayed content to scroll.

Next, at step 224, the intensity of interest evaluation section 28 reads, from the profile storage 26, the profile of the weight coefficient for the operation period $W_d$ and the profile of the weight coefficient for the non-operation period $W_{nop}$ associated with the user ID of the user using the information processing terminal 36A. Further, at step 226, the intensity of interest evaluation section 28 sets the timing t to 0 and also sets an array for storing the intensity of interest evaluation value I(t) for the units of time to 0. Further, at step 228, the intensity of interest evaluation section 28 sets a counter c to 1.

At step 230, the intensity of interest evaluation section 28 acquires, via the acquisition section 22, input operation information output from the input section 14, movement amounts of the terminal detected by the movement amount detection section 16, and the orientation of the terminal detected by the orientation detection section 18.

At step 232, the intensity of interest evaluation section 28 determines whether or not the information processing terminal 36A is in a predetermined orientation based on whether or not, out of the orientation (triaxial acceleration) of the terminal detected by the orientation detection section 18, a z-axis acceleration perpendicular to the display surface of the display 12 is within a predetermined value from gravitational acceleration. The predetermined orientation here means an orientation in a state in which the information processing terminal 36A is placed on a substantial horizontally surface (for example, the top of a desk). Note that step 232 may determine that the information processing terminal 36A is in the predetermined orientation when the z-axis acceleration is within the predetermined value from gravitational acceleration over plural detection cycles T.

A state in which the information processing terminal 36A is placed on a substantially horizontal surface is an unnatural state for the user to view the content displayed on the display 12. Further, a state in which the information processing terminal 36A is placed on a substantially horizontally surface is an inappropriate state for evaluating the intensity of interest of the user based on the movement amount of the terminal since the movement amount of the terminal is zero or is remarkably low. Accordingly, in cases in which negative determination is made at step 232, steps 234 to 238 are skipped and processing transitions to step 240.

Further, in cases in which the information processing terminal 36A is not in the predetermined orientation, negative determination is made at step 232 and processing transitions to step 234. At step 234, the intensity of interest evaluation section 28 determines whether or not there was an input operation by the user within the detection cycle T based on whether or not the input operation information previously acquired at step 230 is information indicating that there was an input operation by the user within the detection cycle T.

In cases in which affirmative determination was made at step 234, the current detection cycle T is considered to be an operation period and processing transitions to step 236. At step 236, the intensity of interest evaluation section 28 calculates the movement amount (movement power) P of the terminal within the detection cycle T by squaring and summing the movement amounts of the information processing terminal 36A (the respective detection values of the triaxial angular velocity, triaxial acceleration, and triaxial terrestrial magnetism) previously acquired at step 230.

Further, the intensity of interest evaluation section 28 derives the weight coefficient for the operation period $W_d$, which corresponds to the movement amount P of the terminal within the detection cycle T, based on the movement amount P of the terminal within the detection cycle T and the profile of the weight coefficient for the operation period $W_d$ previously read at step 224. The weight coefficient for the operation period $W_d$ derived here sets the weight coefficient $W_d$ to 1 if the movement amount P of the terminal is the average movement amount $PA_{ave}$ or less, or if the movement amount P exceeds the average movement amount $PA_{ave}$, sets the weight coefficient $W_d$ such that the value of the weight coefficient $W_d$ increases as the movement amount P increases. Then, a value that is the detection cycle T divided by the derived weight coefficient for the operation period $W_d$ is added to the intensity of interest evaluation value I(t) per unit of time (see also Equation (2) below).

$$I(t+1)=I(t)+(T/W_d) \qquad (2)$$

When the above processing of step 236 has been performed, processing transitions to step 240.

In cases in which negative determination is made at step 234, the current detection cycle T is considered to be a non-operation period and processing transitions to step 238. At step 238, the intensity of interest evaluation section 28 calculates the movement amount (movement power) P of the terminal within the detection cycle T by squaring and summing the movement amounts of the information processing terminal 36A (the respective detection values of the triaxial angular velocity, triaxial acceleration, and triaxial terrestrial magnetism) previously acquired at step 230.

Further, the intensity of interest evaluation section 28 derives the weight coefficient for the non-operation period $W_{nop}$ corresponding to the movement amount P of the terminal within the detection cycle T based on the movement amount P of the terminal within the detection cycle T and the profile of the weight coefficient for the non-operation period $W_{nop}$ previously read at step 224. The weight coefficient for the non-operation period $W_{nop}$ derived here sets the weight coefficient $W_{nop}$ to 1 if the movement amount P of the terminal is the average movement amount $PB_{ave}$ or less, or if the movement amount P exceeds the average movement amount $PB_{ave}$, sets the weight coefficient $W_{nop}$ such that the value of the weight coefficient $W_{nop}$ increases as the movement amount P increases. Then, a value that is the detection cycle T divided by the derived weight coefficient for the non-operation period $W_{nop}$ is added to the intensity of interest evaluation value I(t) per unit of time (see also Equation (3) below).

$$I(t+1)=I(t)+(T/W_{nop}) \qquad (3)$$

When the processing of step 238 has been performed above, processing transitions to step 240.

At step 240, the intensity of interest evaluation section 28 determines whether or not the value of the counter c has reached a predetermined value $c_{max}$. Note that, as an example, when the detection cycle T is 200 msec and the unit of time is 1 sec, the predetermined value $c_{max}$ is 1 sec/200 msec=5.

When negative determination has been made at step 240, processing transitions to step 242, and at step 242, the intensity of interest evaluation section 28 increments the value of the counter c by 1 and returns to step 230. Step 230 to step 242 are accordingly repeated until the value of the counter c reaches the predetermined value $c_{max}$ and affirmative determination is made at step 240. Meanwhile, in the intensity of interest evaluation value I(t) per unit of time, an increase $\Delta I$ (=$(T/W_d)$ or $(T/W_{nop})$) in the intensity of interest evaluation value per detection cycle T is integrated using Equation (2) or Equation (3). Then the intensity of interest evaluation value I(t) per unit of time at the point in time when the value of the counter c has reached the predetermined value $c_{max}$ and affirmative determination has been made at step 240 becomes equivalent to Equation (1) above.

When affirmative determination has been made at step 240, processing transitions to step 244, and at step 244, the intensity of interest evaluation section 28 determines whether or not the intensity of interest evaluation value I(t) per unit of time has exceeded a preset threshold value. In cases in which negative determination was made at step 244, processing transitions to step 250, and at step 250, the intensity of interest evaluation section 28 determines whether or not there has been an instruction from the user to end display of the content. In cases in which negative determination has been made at step 250, processing transitions to step 252, and at step 252, the intensity of interest evaluation section 28 increments the timing t by 1 and processing returns to step 228. Accordingly, as described above, the intensity of interest evaluation value I(t) per unit of time is calculated, and the processing that determines whether or not the calculated intensity of interest evaluation value I(t) per unit of time exceeds the threshold value is repeated while displaying the content subject to intensity of interest evaluation on the display 12.

The user holds the information processing terminal 36A in their hand and views the displayed content while performing appropriate input operations such as instructing the content displayed on the display 12 to scroll. When doing so, when viewing a portion of the displayed content for which the intensity of interest of the user is high, the movement of the information processing terminal 36A is low compared to when viewing portions for which the intensity of interest of the user is low, since the user is concentrating on viewing the content. In operation periods, the movement amount P of the terminal becomes the average movement amount $PA_{ave}$ or less, and in non-operation periods, the movement amount P of the terminal becomes the average movement amount $PB_{ave}$ or less and the increase ΔI in the intensity of interest evaluation value increases such that the intensity of interest evaluation value I(t) per unit of time exceeds a threshold value. Accordingly, affirmative determination is made at step 244 and processing transitions to step 246.

Figure 9:
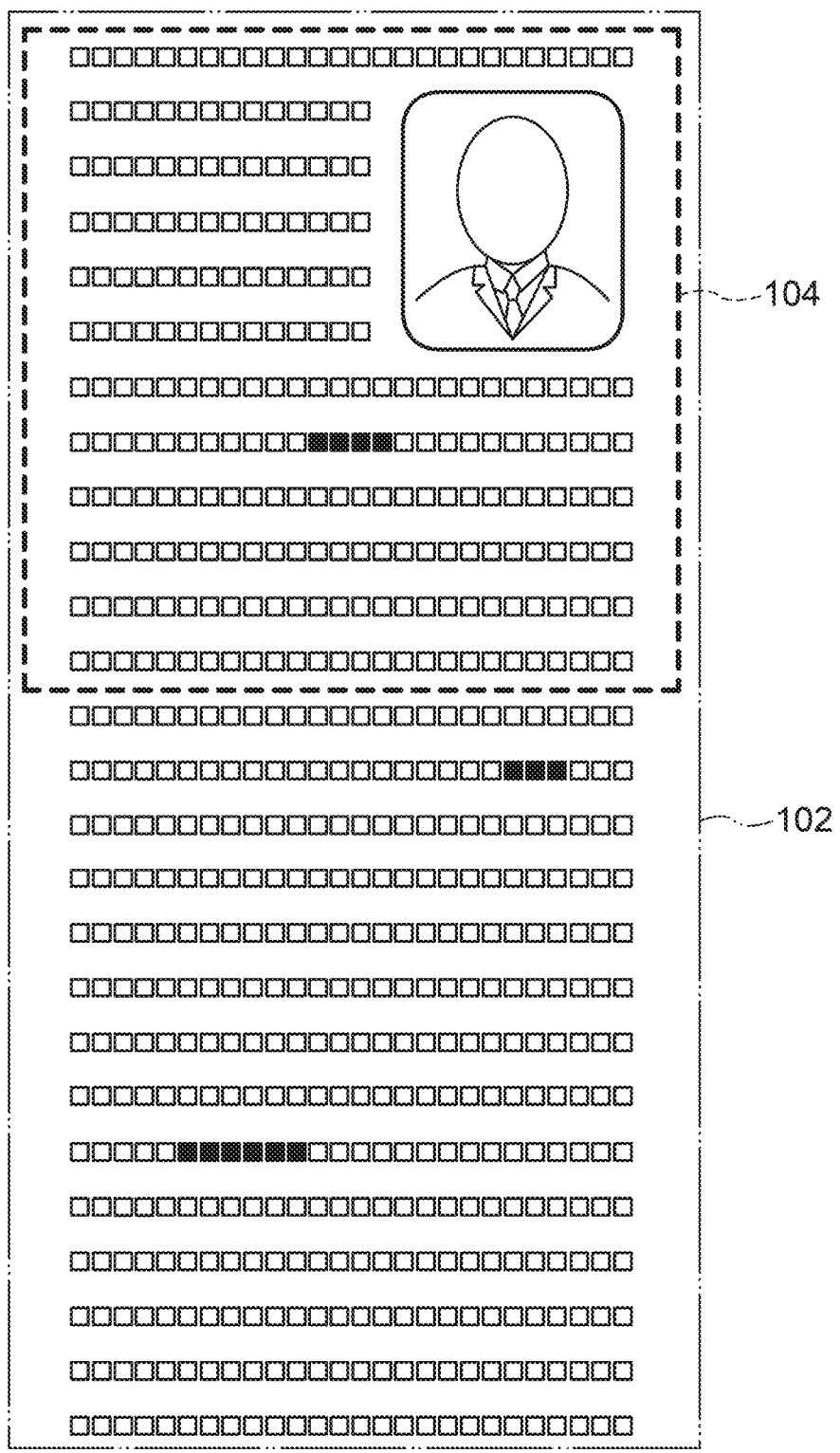
FIG. 9 is a conceptual diagram illustrating content and an example of a keyword preset in in the content.

At step 246, the intensity of interest evaluation section 28 reports, to the content provider 30 (the content providing server 70A), a "intensity of interest peak" signifying that the intensity of interest evaluation value I(t) per unit of time has exceeded the threshold value. Further, the intensity of interest evaluation section 28 also reports, to the content provider 30 (the content providing server 70A), the current display position of the content on the display 12 of the information processing terminal 36A. As an example, FIG. 9 indicates the overall content using reference sign "102" and indicates the current display position (display range) of the content on the display 12 of the information processing terminal 36A using a reference sign "104".

When the "intensity of interest peak" has been reported to the content provider 30 (content providing server 70A) from the information processing terminal 36A, the content provider 30 executes the content provision processing (FIG. 7). Then, in such cases, negative determination is made at step 260 and processing transitions to step 264 of the content provision processing since the information received from the information processing terminal 36A includes information reporting a intensity of interest but does not include information requesting content delivery.

At step 264, from out of the plural items of content information stored in the content storage region 88, the content provider 30 searches for the newest content information delivered to the information processing terminal 36A, which was the origin of the "intensity of interest peak" report. The content information is keywords that represent details of respective portions of the content, and that are pre-set for the respective content portions, like those indicated by the black squares in FIG. 9. The content provider 30 acquires, from the content information extracted by the search, keywords included in the current display position (display range) of the content on the display 12 of the information processing terminal 36A.

Next, at step 266, the content provider 30 searches for advertising information related to the keywords acquired at step 264 from out of the plural items of advertising information stored in the advertising information storage region 90. Searching for advertising information related to the keywords may, for example, be implemented by pre-allocating, to the individual items of advertising information, tags that represent details of the advertising represented by the individual items of advertising information, and searching for advertising information to which tags matching the keywords have been allocated.

Then, at step 268, the content provider 30 delivers advertising information extracted by the search of step 266 to the information processing terminal 36A, which is the origin of the report of the "intensity of interest peak", and the content provision processing ends.

When new advertising information has been delivered from the content providing server 70A, to which the "intensity of interest peak" was reported, the information processing terminal 36A executing the intensity of interest evaluation processing (FIG. 6) performs the processing of step 248 of the intensity of interest evaluation processing. Namely, at step 248, the content display controller 20 switches the advertising being displayed in the predetermined advertisement display region in the display screen of the display 12 to advertising representing the newly delivered advertising information. As an example, the image at the right side of FIG. 8 illustrates a case in which new advertising has been displayed in the advertisement display region 100 at the upper side in the display screen of the display 12, in contrast to the image at the left side.

The new advertising displayed on the advertisement display region 100 is advertising related to keywords included at the display position of the content when the movement of the information processing terminal 36A decreases and the intensity of interest evaluation value I(t) for each unit of time exceeds the threshold value. Accordingly, advertising in which the user has a higher intensity of interest can be displayed to the user.

Second Exemplary Embodiment

Next, a second exemplary embodiment of technology disclosed herein is described. Note that the same reference numerals are allocated to portions that are the same as those of the first exemplary embodiment, and detailed descriptions thereof are omitted.

In the first exemplary embodiment, a mode was described in which the intensity of interest evaluation device 10 is implemented by the information processing terminal 36A. In the second exemplary embodiment, a mode is described in which the profile determination section 24 and the content display controller 20 of the intensity of interest evaluation device 10 are implemented by an information processing terminal 36B. In this mode, the acquisition section 22 and the intensity of interest evaluation section 28 of the intensity of interest evaluation device 10 are implemented by a content providing server 70B.

Figure 10:
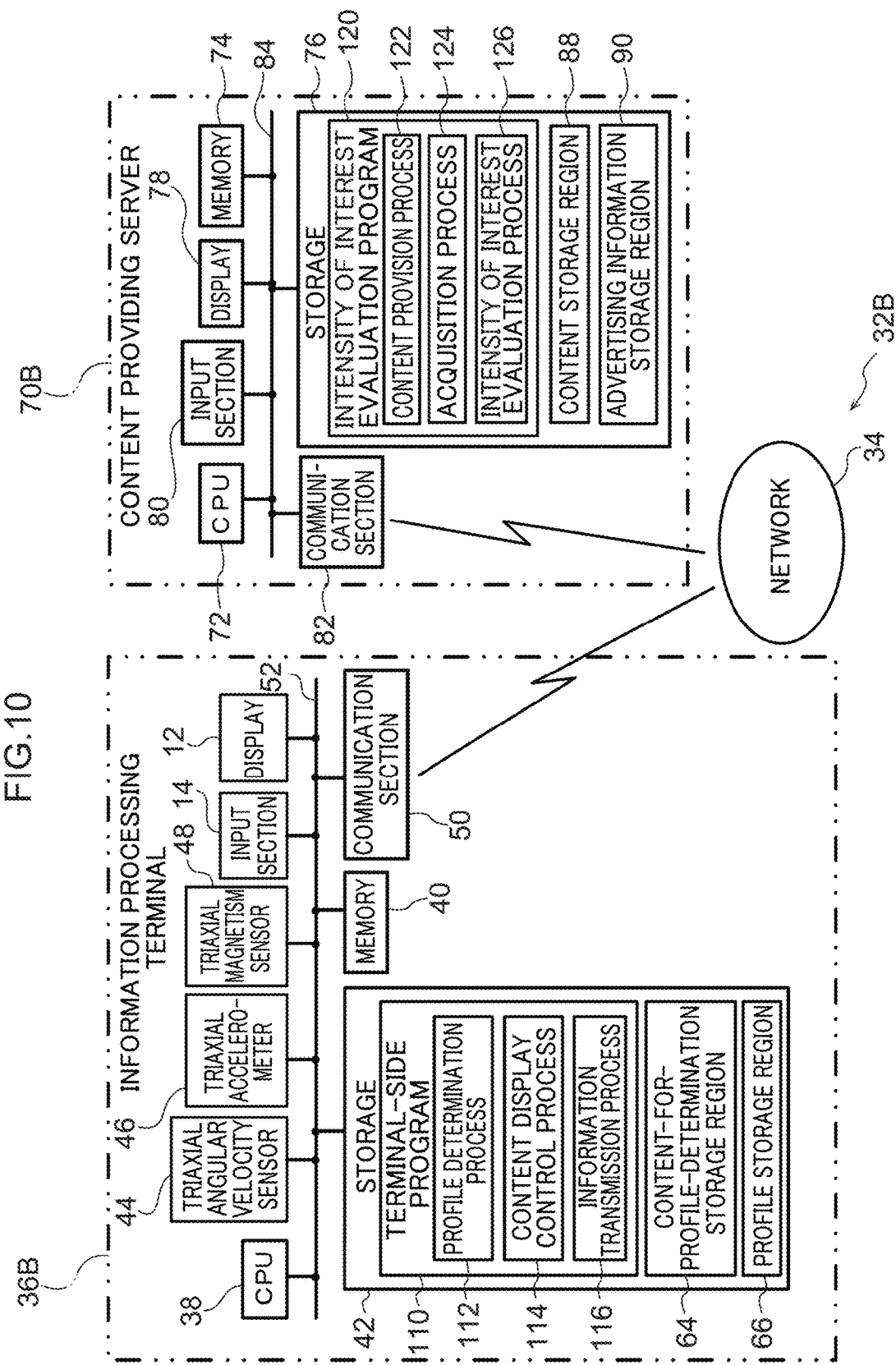
FIG. 10 is a schematic block diagram of a content providing server that functions as an information processing terminal and an intensity of interest evaluation device, according to a second exemplary embodiment.

Namely, an information processing system 32B illustrated in FIG. 10 includes the information processing terminal 36B and the content providing server 70B which are capable of communicating via the network 34. The information processing terminal 36B differs from the information processing terminal 36A described in the first exemplary embodiment in that a terminal-side program 110 is stored in the storage 42 instead of the intensity of interest evaluation program 54. The terminal-side program 110 includes a profile determination process 112, a content display control process 114, and an information transmission process 116. The CPU 38 operates as the profile determination section 24 illustrated in FIG. 1 by executing the profile determination process 112. The CPU 38 also operates as the content display controller 20 illustrated in FIG. 1 by executing the content display control process 56. The CPU 38 also performs processing to transmit information to the content providing server 70B by executing the information transmission process 116.

Further, the content providing server 70B differs from the content provision server 70A described in the first exemplary embodiment in that a intensity of interest evaluation program 120 is stored in the storage 76 instead of the content provision program 86. The intensity of interest evaluation program 120 includes a content provision process 122, an acquisition process 124, and a intensity of interest evaluation process 126. The CPU 72 operates as the content provider 30 illustrated in FIG. 1 by executing the content provision process 122. The CPU 72 also operates as the acquisition section 22 illustrated in FIG. 1 by executing the acquisition process 58. The CPU 72 also operates as the intensity of interest evaluation section 28 illustrated in FIG. 1 by executing the intensity of interest evaluation process 62.

Next, the operation of the second exemplary embodiment is described. Note that the profile determination processing is the same as that of the first exemplary embodiment, and description thereof is therefore omitted.

Figure 11:
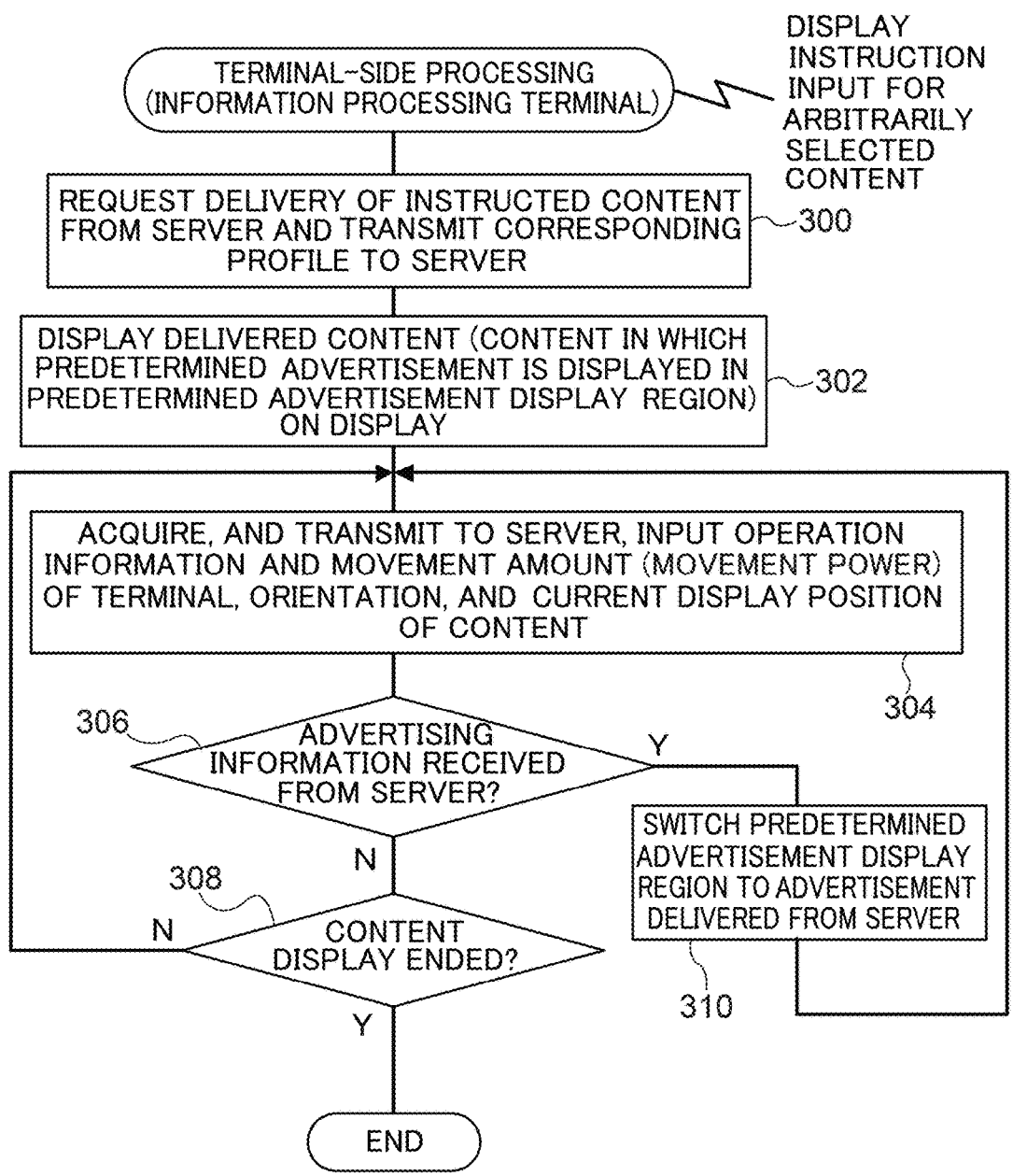
FIG. 11 is a flowchart illustrating an example of terminal-side processing.

The terminal-side processing illustrated in FIG. 11 is executed by the information processing terminal 36B when triggered by an instruction from the user to display arbitrarily selected content on the display 12. At step 220 of the terminal-side processing, the content display controller 20 requests information from the content provider 30 (the content providing server 70B) to request delivery of the content for which display on the display 12 has been instructed by the user. Further, the content display controller 20 reads the profile of the weight coefficient for the operation period $W_d$ and the profile of the weight coefficient for the non-operation period $W_{nop}$ associated with the user ID of the current user of the information processing terminal 36B from the profile storage 26. The content display controller 20 then also transmits the read profiles to the content providing server 70B.

Further, when the content information and the predetermined advertising information have been delivered from the content providing server 70B, the information processing terminal 36B performs the processing of step 302 of the terminal-side processing. Namely, at step 302, the content display controller 20 causes an advertisement representing advertising information to be displayed in the predetermined advertisement display region in the display screen of the display 12, and causes the content represented by the content information to be displayed in the remaining region in the display screen of the display 12. When the content is displayed on the display 12 of the information processing terminal 36B, the user will usually hold the information processing terminal 36B in their hand and view the displayed content while performing appropriate input operations such as instructing the displayed content to scroll.

Next, at step 304, the information processing terminal 36B acquires the input operation information output from the input section 14, the movement amount of the terminal detected by the movement amount detection section 16, and the orientation of the terminal detected by the orientation detection section 18. Then, the information processing terminal 36B transmits each acquired item of information to the content providing server 70B together with the current display position of the content on the display 12 of the information processing terminal 36A.

At step 306, the information processing terminal 36B determines whether or not new advertising information has been received from the content providing server 70B. Processing transitions to step 308 when negative determination was made at step 306, and at step 308, the information processing terminal 36B determines whether or not there was an instruction to end display of content from the user. Processing returns to step 304 in cases in which negative determination was made at step 306, and the processing of steps 304 to 308 repeats until affirmative determination is made at step 306 or step 308. Meanwhile, the information processing terminal 36B repeats the processing to acquire, and transmit to the content providing server 70B, the input operation information, the movement amount of the terminal, and the orientation of the terminal for each detection cycle T.

In cases in which new advertising information has been received from the content providing server 70B, the determination of step 306 is affirmative and processing transitions to step 310. At step 310, the content display controller 20 switches the advertisement being displayed in the predetermined advertisement display region in the display screen of the display 12 to an advertisement representing the newly delivered advertising information and processing returns to step 304. Further, in cases in which there has been an instruction from the user to end display of the content, affirmative determination is made at step 308 and the terminal-side processing ends.

The intensity of interest evaluation processing illustrated in FIG. 12 is executed by the content providing server 70B when triggered by the receipt of a delivery request for content from the information processing terminal 36B. At step 320 of the intensity of interest evaluation processing, the intensity of interest evaluation section 28 stores the profiles of the current user of the information processing terminal 36B, received together with the delivery request for content from the information processing terminal 36B, in the memory 74 or the like.

At step 322, the content provider 30 reads, from the content storage region 88, the information of the content that the information processing terminal 36B requested for delivery and also reads predetermined advertising information from the advertising information storage region 90. The content provider 30 then delivers (transmits) the content information and the predetermined advertising information to the information processing terminal 36B from which the delivery request originated.

Next, since step 324 to step 352 are substantially the same as steps 226 to 252 of the intensity of interest evaluation processing (FIG. 6) described in the first exemplary embodiment, description is only given of the points that differ.

At step 328 of the intensity of interest evaluation processing illustrated in FIG. 12, the acquisition section 22 acquires the input operation information, the movement amount of the terminal, the orientation of the terminal and the current display position of the content, by receiving these from the information processing terminal 36B. Further, at step 348 of the intensity of interest evaluation processing illustrated in FIG. 12, the intensity of interest evaluation section 28 delivers to the information processing terminal 36B the advertising information extracted by the previous search of step 346. Further, at step 350 of the intensity of interest evaluation processing illustrated in FIG. 12, the intensity of interest evaluation section 28 determines whether display of the content has ended based on whether or not the receipt of the input operation information from the information processing terminal 36B, the movement amount of the terminal, the orientation of the terminal, and the current display position of the content was interrupted.

Thus, in each exemplary embodiment above, the value of the movement amount P of the information processing terminal 36 is detected by the movement amount detection section 16 installed to the information processing terminal 36 in the period in which the content is being displayed on an information processing terminal 36. Then, the intensity of interest toward the content is evaluated based on the length of a first period (a period of weight coefficient W=1) within the period, in which the value of the movement amount P of the information processing terminal 36 is equal to or less than the average movement amount $PA_{ave}$ or $PB_{ave}$. Namely, the weight coefficient W, by which the duration of the given period is divided, is set to 1 for periods in which the value of the movement amount P of the information processing terminal 36 exceeds the average movement amount $PA_{ave}$ or PB$_{ave}$. Thus, the evaluation precision of the intensity of interest toward the content can be increased.

Further, in each exemplary embodiment above, evaluation of the intensity of interest is performed by relatively changing the weight for the evaluation of the intensity of interest for the length of a second period in which the value of the movement amount of the information processing terminal 36 exceeds the average movement amount P$_{ave}$ within the period in which the content is being displayed on the information processing terminal 36. Namely, the weight for the evaluation of the intensity of interest of the length of the second period is set to a weight that is smaller than the weight for the evaluation of the intensity of interest of the length of the first period, and evaluation of the intensity of interest is performed based on the length of the first period and the length of the second period. More precisely, the weight coefficient W by which the duration of this period is divided is set greater than 1 for the period in which the value of the movement amount P of the information processing terminal 36 exceeds the average movement amount P$_{ave}$. This enables variation in the evaluation of the intensity of interest caused by fluctuations in the movement amount P of the information processing terminal 36 due to the condition of the user, the surrounding environment of the information processing terminal 36, and the like to be suppressed compared to cases in which the length of the second period is not factored into the evaluation of the intensity of interest.

Further, in each of the exemplary embodiments, evaluation of the intensity of interest is performed such that the weight that the length of the second period has on the evaluation value of the intensity of interest decreases as the value of the movement amount P of the information processing terminal 36 in the second period in which the value of the movement amount P of the information processing terminal 36 exceeds the average movement amount P$_{ave}$ increases. Namely, when the movement amount P of the information processing terminal 36 exceeds the average movement amount P$_{ave}$, the value of the weight coefficient W greatly increases as the movement amount P increases. This enables phenomena in which the movement amount P of the information processing terminal 36 becomes small if the intensity of interest toward the content is high to be reflected in the evaluation of the intensity of interest more accurately than in cases in which the length of the second period is factored into the evaluation of the intensity of interest with a fixed weight irrespective of the magnitude of the movement amount P.

Further, in each of the exemplary embodiments above, the orientation of the information processing terminal 36 is determined by the orientation detection section 18 installed to the information processing terminal 36 in the period in which the content is being displayed on the information processing terminal 36. Then, a period in which it was determined that the information processing terminal 36 is in a predetermined orientation within the period in which the content is being displayed on the information processing terminal 36 is excluded from the evaluation of the intensity of interest toward the content. This enables erroneous evaluation of the intensity of interest as being high when the information processing terminal 36 is placed on a substantially horizontal surface such as on a desk to be suppressed.

Further, in each of the exemplary embodiments above, the value of the movement amount P of the information processing terminal 36 is detected by the movement amount detection section 16 installed to the information processing terminal during a display period in which the content for profile determination is being displayed on the information processing terminal 36. Then, the average movement amount P$_{ave}$ is determined based on the value of the movement amount P of the information processing terminal 36 in the display period of the content for profile determination, and the profile of the weight coefficient W is determined. This enables the evaluation precision of the intensity of interest toward the content to be further increased by taking into consideration differences in the movement amount P of the information processing terminal 36 between each user when concentrating on viewing the content.

Further, in each of the exemplary embodiments above, within the display period of the content, input operation information enabling identification of operation periods in which operations were input to the information processing terminal 36 and non-operation periods in which operations were not input to the information processing terminal 36 is acquired. Then, the intensity of interest is evaluated based on the length of the period within the operation period in which the value of the movement amount P of the information processing terminal 36 is the average movement amount PA$_{ave}$ for the operation period or less and the length of the period within the non-operation period in which the value of the movement amount P of the information processing terminal 36 is the average movement amount PB$_{ave}$ for the non-operation period or less. This enables the evaluation precision of the intensity of interest toward the content to be further increased by taking into consideration the fact that the values of the movement amounts P of the information processing terminal 36 when concentrating on viewing the content are not necessarily equivalent in the operation period and the non-operation period.

Note that in the modes described above, the values of the weight coefficients W$_d$ and W$_{nop}$ increase linearly with respect to increases in the movement amount P when the movement amount P of the information processing terminal 36 exceeds that average movement amount PA$_{ave}$ or PB$_{ave}$. However, there is no limitation thereto. For example, configuration may be made such that the value of at least one out of the weight coefficients W$_d$ or W$_{nop}$ increases non-linearly with respect to increases in the movement amount P.

Further, since the operation time is divided by the weight coefficient W$_d$ and the non-operation time is divided by the weight coefficient W$_{nop}$ in Equation (1), the value of the weight coefficients W$_d$ and W$_{nop}$ increase when the movement amount P of the information processing terminal 36 exceeds the average movement amount PA$_{ave}$ or PB$_{ave}$. However, there is no limitation thereto. In principle it is also possible to calculate the intensity of interest evaluation value I(t) by an arithmetic equation that multiplies the weight coefficient W by the operation time and the non-operation time. The weight coefficient W may decrease as the movement amount P increases in such cases.

Further, in the modes described above, portions in which the user exhibits a high intensity of interest from out of the content displayed on the information processing terminal 36 are identified by comparing the intensity of interest evaluation value I(t) per unit of time against a threshold value. However, there is no limitation thereto. The intensity of interest evaluation value I(t) per unit of time can also employ an evaluation of the intensity of interest of the user toward a single item of content overall by integrating the intensity of interest with respect to the period in which the user was viewing the content (t=0 to viewing time).

Further, in the mode described above, the profile of the weight coefficients W$_d$ and W$_{nop}$ are determined for each user by the profile determination processing (FIG. 3). However, there is no limitation thereto. For example, if the movement amount P of the information processing terminal 36 when concentrating on viewing the content can be specified to some extent according to user characteristics such as the age and sex of the user, or the length of a usage period of the information processing terminal 36, then the profile can also be selected according to the characteristics of the user. In such cases, the profile determination processing can be obviated by preparing profiles for each user attribute in advance.

Further, in the mode described above, the intensity of interest evaluation program 54, 120, which is an example of a intensity of interest evaluation program according to technology disclosed herein, was pre-stored (installed) in the storage 42 or the storage 76. However, the intensity of interest evaluation program according to technology disclosed herein may be provided in a mode stored on a recording medium such as a CD-ROM, DVD-ROM, or a memory card.

Although the intensity of interest of the user toward the content displayed on an information processing terminal has some correlation with time spent viewing the content, the time spent viewing the content is also greatly influenced by the extent to which the user was concentrating on viewing the content. Further, when, for example, plural items of information were included in the content viewed by the user, whether the intensity of interest in any one item out of the plural items of information included in the content was high is not determinable from the time spent viewing the content.

One aspect has an advantageous effect of enabling evaluation precision of intensity of interest toward content to be increased.

All cited documents, patent applications, and technical standards mentioned in the present specification are incorporated by reference in the present specification to the same extent as if each individual cited document, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable recording medium storing an intensity of interest evaluation program that causes a computer to execute a process, the process comprising:
   using a movement amount detection sensor installed to an information processing terminal to detect a value of a movement amount of an information processing terminal in a period in which content is being displayed on the information processing terminal;
   acquiring input operation information enabling identification of an operation period within the period in which an operation was input to the information processing terminal and a non-operation period within the period in which no operation was input to the information processing terminal; and
   evaluating the intensity of interest toward the content based on a length of a first period within the operation period in which the value of the movement amount detected by the information processing terminal is a first predetermined value or less and based on a length of a second period within the non-operation period in which the value of the movement amount detected by the information processing terminal is a second predetermined value or less.

2. The computer-readable recording medium of claim 1, wherein evaluation of the intensity of interest is performed based on the length of the first period and the length of the second period by applying a smaller weight to the length of the second period in the evaluation of the intensity of interest than to the length of the first period in the evaluation of the intensity of interest.

3. The computer-readable recording medium of claim 2, wherein evaluation of the intensity of interest is performed such that the weight that the length of the second period has on an evaluation value of the intensity of interest decreases as the value of the movement amount of the information processing terminal in the second period increases.

4. The computer-readable recording medium of claim 1, the process further comprising:
   using an orientation detection sensor installed to the information processing terminal to determine the orientation of the information processing terminal in the period in which the content is being displayed on the information processing terminal; and
   excluding from the evaluation of the intensity of interest toward the content a period within the period in which the information processing terminal is determined to be in a predetermined orientation.

5. The computer-readable recording medium of claim 1, the process further comprising:
   using the movement amount detection sensor to detect a value of a movement amount of the information processing terminal in a display period in which predetermined content is being displayed on the information processing terminal; and
   determining at least one of the first and second predetermined value based on the value of the movement amount of the information processing terminal in the display period.

6. The computer-readable recording medium of claim 1, the process further comprising:
   using the movement amount detection sensor to detect a value of a movement amount of the information processing terminal in a display period in which predetermined content is being displayed on the information processing terminal and also acquiring the input operation information that enables identification of the operation period and the non-operation period within the display period; and
   determining the first predetermined value for the operation period based on the value of the movement amount of the information processing terminal in the operation period and also determining the second predetermined value for the non-operation period based on the value of the movement amount of the information processing terminal in the non-operation period.

7. The computer-readable recording medium of claim 1, wherein the computer is the information processing terminal.

8. The computer-readable recording medium of claim 1, wherein the computer is a server computer capable of communicating with the information processing terminal.

9. The computer-readable recording medium of claim 1, wherein the first predetermined value is an average movement amount of the information processing terminal during the operation period and the second predetermined value is an average movement amount of the information processing terminal during the non-operation period.

10. The computer-readable recording medium of claim 1, further comprising:
setting a first weight during the operation period; and
setting a second weight during the operation period, and wherein
the intensity of interest is evaluated by applying the first weight to the first period and the second weight to the second period.

11. The computer-readable recording medium of dependent claim 10, wherein
the first weight is set during the operation period based on an average movement amount of the information processing terminal during the operation period; and
the second weight is set during the non-operation period based on an average movement amount of the information processing terminal during the non-operation period.

12. An intensity of interest evaluation device comprising:
a memory; and
a processor coupled to the memory, the processor being configured to execute a process, the process comprising:
acquiring a value of a movement amount of an information processing terminal detected by a movement amount detection sensor installed in the information processing terminal in a period in which content is being displayed on the information processing terminal;
acquiring input operation information enabling identification of an operation period within the period in which an operation was input to the information processing terminal and a non-operation period within the period in which no operation was input to the information processing terminal; and
evaluating the intensity of interest toward the content based on a length of a first period within the operation period in which the value of the movement amount detected by the information processing terminal is a first predetermined value or less and based on a length of a second period within the non-operation period in which the value of the movement amount detected by the information processing terminal is a second predetermined value or less.

13. The intensity of interest evaluation device of claim 12, wherein the process comprises performing evaluation of the intensity of interest based on the length of the first period and the length of the second period by applying a smaller weight to the length of the second period in the evaluation of the intensity of interest than to the length of the first period in the evaluation of the intensity of interest.

14. The intensity of interest evaluation device of claim 13, wherein the process comprises performing evaluation of the intensity of interest such that the weight that the length of the second period has on an evaluation value of the intensity of interest decreases as the value of the movement amount of the information processing terminal in the second period increases.

15. The intensity of interest evaluation device of claim 12, wherein the process comprises:
acquiring the orientation of the information processing terminal determined by an orientation detection sensor installed to the information processing terminal in the period in which the content is being displayed on the information processing terminal; and
excluding from the evaluation of the intensity of interest toward the content a period within the period in which the information processing terminal is determined to be in a predetermined orientation.

16. The intensity of interest evaluation device of claim 12, wherein the process comprises:
acquiring a value of a movement amount of the information processing terminal detected using the movement amount detection sensor in a display period in which predetermined content is being displayed on the information processing terminal; and
determining at least one of the first and second predetermined value based on the value of the movement amount of the information processing terminal in the display period.

17. The intensity of interest evaluation device of claim 12, wherein the process comprises:
acquiring a value of a movement amount of the information processing terminal detected by the movement amount detection sensor in a display period in which predetermined content is being displayed on the information processing terminal and also acquires the input operation information that enables identification of the operation period and the non-operation period within the display period; and
determining the first predetermined value for the operation period based on the value of the movement amount of the information processing terminal in the operation period and also determines the second predetermined value for the non-operation period based on the value of the movement amount of the information processing terminal in the non-operation period.

18. The intensity of interest evaluation device of claim 12, the intensity of interest evaluation device is the information processing terminal.

19. The intensity of interest evaluation device of claim 10, wherein the intensity of interest evaluation device is a server computer capable of communicating with the information proc20-essing terminal.

20. An intensity of interest evaluation method comprising:
using, by a processor, a movement amount detection sensor installed to an information processing terminal to detect a value of a movement amount of an information processing terminal in a period in which content is being displayed on the information processing terminal
acquiring, by the processor, input operation information enabling identification of an operation period within the period in which an operation was input to the information processing terminal and a non-operation period within the period in which no operation was input to the information processing terminal; and
evaluating, by the processor, the intensity of interest toward the content based on a length of a first period within the operation period in which the value of the movement amount detected by the information processing terminal is a first predetermined value or less and based on a length of a second period within the non-operation period in which the value of the movement amount detected by the information processing terminal is a second predetermined value or less.

* * * * *